US012746615B2

(12) United States Patent

Kirschner et al.

(10) Patent No.: US 12,746,615 B2

(45) Date of Patent: Sep. 29, 2026

(54) METHOD FOR PROVIDING A COMPONENT ASSEMBLY FOR A MOTOR VEHICLE, AND COMPONENT ASSEMBLY FOR A MOTOR VEHICLE

(71) Applicant: Bayerische Motoren Werke Aktiengesellschaft, Munich (DE)

(72) Inventors: Robert Kirschner, Olching (DE); Mario Meinhardt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 980 days.

(21) Appl. No.: 17/801,056

(22) PCT Filed: Jan. 27, 2021

(86) PCT No.: PCT/EP2021/051842

§ 371 (c)(1),
(2) Date: Aug. 19, 2022

(87) PCT Pub. No.: WO2021/165002

PCT Pub. Date: Aug. 26, 2021

(65) Prior Publication Data

US 2023/0078654 A1 Mar. 16, 2023

(30) Foreign Application Priority Data

Feb. 20, 2020 (DE) ..................... 10 2020 104 473.9

(51) Int. Cl.

*B23K 11/11* (2006.01)
*B23K 11/20* (2006.01)

(Continued)

(52) U.S. Cl.

CPC ............ *B23K 11/115* (2013.01); *B23K 11/20* (2013.01); *F16B 5/08* (2013.01); *F16B 11/006* (2013.01)

(58) Field of Classification Search

CPC ..... B23K 11/115; B23K 11/20; F16B 11/006; F16B 5/08

(Continued)

(56) References Cited

U.S. PATENT DOCUMENTS

| | | | | |
|---|---|---|---|---|
| 5,305,946 | A | 4/1994 | Heilmann | |
| 6,291,792 | B1 * | 9/2001 | Fussnegger | B23K 11/20 219/118 |
| 2003/0167620 | A1 * | 9/2003 | Wang | F16B 5/04 29/525.06 |

(Continued)

FOREIGN PATENT DOCUMENTS

| | | | |
|---|---|---|---|
| CN | 109202247 | A | 1/2019 |
| CN | 110546228 | * | 12/2019 |

(Continued)

OTHER PUBLICATIONS

English-language Chinese Office Action issued in Chinese application No. 202180007226.2 dated Mar. 31, 2023 (Ten (10) pages).

(Continued)

*Primary Examiner* — Ibrahime A Abraham
*Assistant Examiner* — Joseph W Iskra
(74) *Attorney, Agent, or Firm* — Crowell & Moring LLP

(57) ABSTRACT

A method for providing a component assembly for a motor vehicle includes inserting a weldable element into an opening of a first metal sheet such that a joint is defined between the weldable element and the first metal sheet and such that a reservoir connected to the joint is preserved at a first side of the first metal sheet that faces a second metal sheet where the reservoir is open in a direction toward the second metal sheet. The method further includes applying an adhesive to the first side of the first metal sheet and/or to the second metal sheet and placing the second metal sheet against the first metal sheet and the weldable element and welding the second metal sheet to the weldable element.

10 Claims, 1 Drawing Sheet

(51) Int. Cl.
*F16B 5/08* (2006.01)
*F16B 11/00* (2006.01)

(58) Field of Classification Search
USPC .......................................................... 219/91.2
See application file for complete search history.

(56) References Cited

U.S. PATENT DOCUMENTS

| | | | |
|---|---|---|---|
| 2013/0269873 | A1 | 10/2013 | Herzinger et al. |
| 2016/0158873 | A1 | 6/2016 | Amedick et al. |
| 2016/0167158 | A1 | 6/2016 | Spinella et al. |
| 2020/0086374 | A1 | 3/2020 | Eberhardt et al. |

FOREIGN PATENT DOCUMENTS

| | | | |
|---|---|---|---|
| DE | 1 565 438 | A1 | 4/1970 |
| DE | 10 2010 013 089 | A1 | 9/2011 |
| DE | 102010013089 | * | 9/2011 |
| DE | 10 2013 216 820 | A1 | 2/2015 |
| DE | 10 2017 005 123 | A1 | 11/2017 |
| DE | 10 2017 205 940 | A1 | 10/2018 |
| DE | 10 2017 210 864 | A1 | 1/2019 |
| DE | 10 2017 219 854 | A1 | 5/2019 |
| FR | 2 962 929 | A1 | 1/2012 |
| WO | WO 2018/235753 | A1 | 12/2018 |
| WO | WO2018235753 | * | 12/2018 |

OTHER PUBLICATIONS

PCT/EP2021/051842, International Search Report dated May 11, 2021 (Two (2) pages).

German Search Report issued in German application No. 10 2020 104 473.9 dated Jan. 19, 2021, with Statement of Relevancy (Eight (8) pages).

* cited by examiner

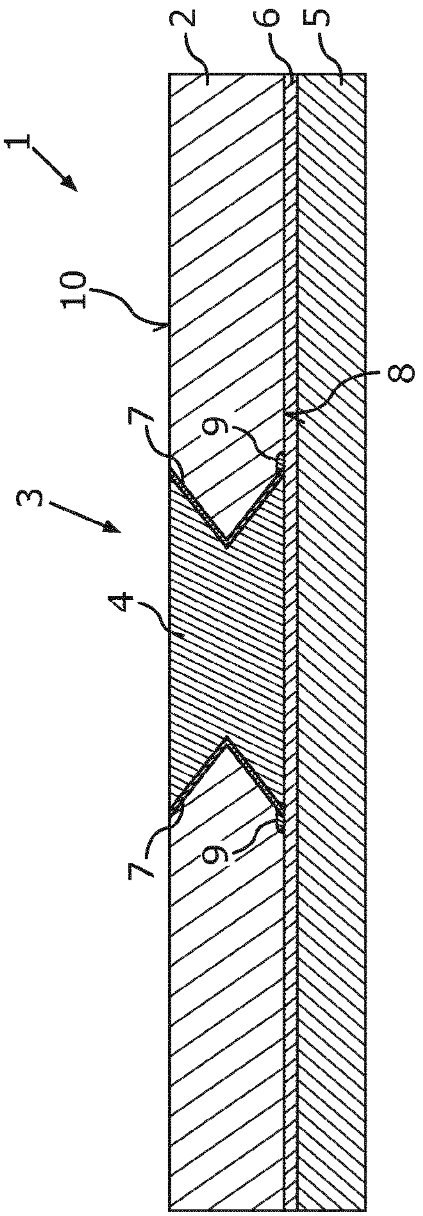
1
2
3
4
5
6
7
7
8
9
9
10

METHOD FOR PROVIDING A COMPONENT ASSEMBLY FOR A MOTOR VEHICLE, AND COMPONENT ASSEMBLY FOR A MOTOR VEHICLE

BACKGROUND AND SUMMARY OF THE INVENTION

The invention relates to a method for providing a component assembly for a motor vehicle and a component assembly for a motor vehicle.

DE 10 2017 205 940 A1 discloses a method for producing a component assembly by means of resistance welding, in which a joining element is inserted into an aluminum sheet, whereby the joining element is contacted with a steel sheet which abuts the aluminum sheet. An electric current is conducted at least by the joining element and the steel sheet in order to obtain a heating caused by resistance, whereby in the contact region of the joining element with the steel sheet a welding region is formed. In addition to the welding connection, it is possible to produce an adhesive connection between the aluminum sheet and the steel sheet. To this end, an adhesive is introduced at least in a region of one of the metal sheets. The introduction of heat as a result of resistance can improve the generation of the adhesive connection in this case and allow a particularly great bond between the adhesively bonded faces.

An object of the present invention is to provide a method for providing a component assembly for a motor vehicle and a component assembly for a motor vehicle which allow a particularly reliable connection of a first metal sheet to a second metal sheet and, in this case, to provide a particularly great corrosion protection of the component assembly.

This object is achieved according to the invention by a method for providing a component assembly for a motor vehicle and by a component assembly for a motor vehicle.

A first aspect of the invention relates to a method for providing a component assembly for a motor vehicle, wherein a weldable element is inserted into an opening of a first metal sheet. The first metal sheet is, for example, an aluminum sheet. The method further provides for a second metal sheet to be placed against one side of the first metal sheet and for an adhesive to be arranged between the metal sheets for adhesively bonding the metal sheets. The second metal sheet is, for example, a steel sheet. The second metal sheet is placed against the weldable element and welded to the weldable element. Consequently, the component assembly is produced in the context of a resistance element welding operation, wherein the weldable element allows a reliable connection between the first metal sheet and the second metal sheet. The component assembly is a mixed construction connection. This means that the first metal sheet and the second metal sheet are made from mutually different materials, in particular mutually different metals. The first metal sheet can be welded to the second metal sheet directly only with difficulty, or not at all. Consequently, the weldable element is used as an auxiliary means in order to be able to reliably connect the first metal sheet to the second metal sheet. The weldable element is configured to be welded to the second metal sheet. The weldable element and the second metal sheet can be welded to each other by means of resistance welding. In particular, there is provision for the weldable element to be introduced into the first metal sheet and subsequently for the adhesive to be applied at the side of the first metal sheet and/or to the second metal sheet. Subsequently, the second metal sheet is placed against the side of the first metal sheet, whereby the second metal sheet is contacted by the first metal sheet and by the weldable element. Consequently, the second metal sheet is adhesively bonded to the first metal sheet via the adhesive and, furthermore, the second metal sheet is welded to the weldable element, whereby the second metal sheet is retained on the first metal sheet in a particularly reliable manner. In order to be able to generate a particularly great corrosion protection of the component assembly, there is provision according to the invention for a reservoir which is open in the direction toward the side to be preserved at a joint between the first metal sheet and the weldable element when the weldable element is placed in the opening of the first metal sheet at the side of the first metal sheet facing the second metal sheet. When the second metal sheet is placed against the side of the first metal sheet facing the second metal sheet, the adhesive which is arranged at the side of the first metal sheet and/or at the second metal sheet can flow into the reservoir. There is provision for the adhesive to flow into the joint between the weldable element and the first metal sheet via the reservoir. In particular, there is provision for the adhesive to completely fill the joint between the weldable element and the first metal sheet. An accumulation of moisture or a precipitation of air humidity in the joint can thereby be prevented. Direct contact of the weldable element and the first metal sheet with water can consequently be prevented. Since direct contact of the weldable element and the first metal sheet with water is prevented, a risk of corrosion of the component assembly can be kept particularly small.

In another embodiment of the invention, there is provision for the weldable element to terminate flush with the side of the first metal sheet facing the second metal sheet and to completely cover an opening cross section of the opening. The flush termination of the weldable element with the side of the first metal sheet facing the second metal sheet brings about a particularly extensive contact between the second metal sheet and the weldable element, whereby a particularly reliable connection between the weldable element and the second metal sheet can be provided. The term "flush termination" of the weldable element with the first metal sheet, in particular a wall of the first metal sheet delimiting the opening, is intended to be understood to mean that the weldable element does not either spring back substantially behind the wall which delimits the opening of the first metal sheet or project forward substantially beyond it. The complete coverage of the opening cross section of the opening by means of the weldable element ensures a particularly reliable retention of the weldable element against the first metal sheet and via the weldable element a particularly reliable retention of the first metal sheet against the second metal sheet. In this case, the weldable element can be constructed to be conical at least in regions, in particularly it can have an hourglass-like geometry, whereby a particularly reliable connection between the weldable element and the first metal sheet can be provided.

In another embodiment of the invention, it has been found to be advantageous, after the second metal sheet has been placed against the first metal sheet, for a vacuum suction device which covers the joint and by means of which the adhesive can be drawn from the reservoir into the joint to be placed against an additional side of the first metal sheet facing away from the second metal sheet. By means of the vacuum suction device, consequently, the joint which opens in the opening between the weldable element and the first metal sheet can be acted on with a reduced pressure, whereby adhesive which has accumulated in the reservoir flows into the joint. By means of the vacuum suction device which is placed against the side of the first metal sheet which is opposite the reservoir, consequently, the adhesive is drawn into the joint, whereby the joint can be filled with the adhesive. As a result of the adhesive flowing into the joint, the at least one joint is completely filled, whereby a precipitation of air humidity in the joint can be prevented, whereby again a risk of corrosion of the component assembly can be kept particularly small.

In another embodiment of the invention, there is provision for the weldable element and the second metal sheet to be welded to each other via resistance spot welding. During resistance spot welding, an electrode via which electric current is supplied to the weldable element and the second metal sheet is placed against the weldable element and the second metal sheet, respectively. Joule current heating which is produced by a local current flow through the weldable element and the second metal sheet is used to heat a contact location between the weldable element and the second metal sheet. As a result of a consequent resistance heat at the contact location between the weldable element and the second metal sheet, the weldable element and the second metal sheet are heated at the contact location until reaching a necessary welding temperature. As a result of the heating, the weldable element and the second metal sheet are molten locally and are joined to each other as a result of the molten mass solidifying. The weldable element and the second metal sheet can be connected to each other in a particularly simple and reliable manner by means of the resistance spot welding.

In this context, it has been found to be particularly advantageous if a temperature which is intended to be adjusted in the joint is predetermined and a current flow of the resistance spot welding is adjusted in accordance with the temperature intended to be adjusted. The temperature in the joint results particularly from heating the weldable element as a result of the electric current being applied by means of the electrodes to the weldable element and the second metal sheet. In other words, the welding temperature is selected in accordance with which temperature is intended to result in the joint between the weldable element and the first metal sheet. A temperature resulting in the joint influences respective flow properties of the adhesive which is arranged in the reservoir and which is intended to flow into the joint. In particular, the temperature which is intended to be adjusted in the joint can be selected in such a manner that a flow of the adhesive out of the reservoir into the joint can be ensured when the weldable element is welded to the second metal sheet with at least one predetermined minimum level of probability. Via the welding temperature, consequently, the flow of the adhesive into the joint can be ensured, which results in the component assembly being able to be protected from corrosion in a particularly reliable manner.

It has further been found to be advantageous for an adjustment of the temperature to be established during resistance spot welding in the joint and for the adhesive to be selected with adhesive substance proportions, the boiling point of which is below the established temperature. This means that the adhesive is selected in accordance with the welding temperature, particularly the temperature produced in the joint as a result of the welding temperature, in order to ensure that the adhesive substance proportions move into the joint when the weldable element is welded to the second metal sheet, whereby the weldable element is adhesively bonded to the wall of the first metal sheet which delimits the opening, whereby the weldable element is reliably retained on the wall of the first metal sheet which delimits the opening and is at the same time electrically insulated against the wall of the first metal sheet which delimits the opening. When the weldable element is welded to the second metal sheet, the welding temperature is produced in the weldable element and, consequently, a temperature dependent on the welding temperature results in the joint. As a result of the temperature resulting in the joint, the adhesive substance proportions of the adhesive, the boiling point of which is below the temperature resulting in the joint, evaporate and vaporize into the joint, in which they can precipitate, whereby the weldable element is adhesively bonded to the wall of the first metal sheet delimiting the opening. By the adhesive substance proportions being adapted by the selection thereof using the boiling point thereof, the movement of the adhesive substance proportions into the joint can be ensured during resistance spot welding of the weldable element to the second metal sheet.

In another embodiment of the invention, it has been found to be advantageous if an adhesive is arranged at the side of the first metal sheet facing the second metal sheet, which adhesive contains magnetizable particles and/or a propellant and/or a gelling agent. By means of the propellant, the adhesive arranged in the reservoir can be urged into the joint. By means of the gelling agent, a viscosity of the adhesive arranged in the reservoir can be adjusted, in particular the adhesive arranged in the reservoir can be gelled, whereby flow properties of the adhesive can be adjusted, which results in the adhesive flowing in a particularly secure and reliable manner into the joint. The magnetizable particles are configured to become orientated as a result of the magnetic field which results from the current flow which is produced during the resistance spot welding between the weldable element and the second metal sheet, whereby the adhesive which contains the magnetizable particles flows from the reservoir into the joint. Both the magnetizable particles and the propellant and the gelling agent allow a particularly reliable flow of the adhesive into the joint, whereby it can be ensured that the joint is completely filled with the adhesive. Consequently, a risk of corrosion for the component assembly can be kept particularly small.

In another embodiment of the invention, there is provision for the component assembly to be heated in a heating apparatus after the second metal sheet is adhesively bonded to the first metal sheet. The heating apparatus may, for example, be a dryer of a device for cathode dip-coating of the component assembly. As a result of the heating of the component assembly, the adhesive can flow out of the reservoir into the joint. In particular, as a result of the heating of the component assembly, the adhesive can be heated, whereby a viscosity of the adhesive is reduced, which again results in particularly advantageous flow properties of the adhesive and consequently a particularly reliable flow of the adhesive into the joint. During the method, consequently, the weldable element is arranged in the opening of the first metal sheet, subsequently the adhesive is applied at the side of the first metal sheet facing the second metal sheet and/or to the second metal sheet, and the second metal sheet is placed against the side of the first metal sheet. Subsequently, the component assembly is heated by means of the heating apparatus, whereby the adhesive flows out of the reservoir into the joint. After the adhesive has flowed into the joint, in particular after the component assembly has been heated by means of the heating apparatus, the weldable element is welded to the second metal sheet. The heating of the component assembly before the welding ensures that the joint is completely filled with the adhesive. The heating of the component assembly provides a particularly simple method of adjusting flow properties of the adhesive, whereby the adhesive flows into the joint in a particularly reliable manner, whereby an advantageously complete filling of the joint with the adhesive can be achieved.

The invention further relates to a component assembly for a motor vehicle, having a first metal sheet which has an opening and having a weldable element which is inserted into the opening. The first metal sheet and the weldable element thereby delimit a joint. This weldable element terminates particularly flush with a side of the first metal sheet, wherein the first metal sheet is configured to be connected to a second metal sheet at the side. The weldable element completely covers in particular an opening cross section of the opening. In order to keep a risk of corrosion of the first metal sheet with the weldable element particularly low, there is provision according to the invention for a reservoir which is open in the direction toward the side to be preserved at the side at a joint between the first metal sheet and the weldable element. An adhesive can be introduced into the reservoir. The adhesive is in particular introduced into the reservoir by the adhesive being applied to the side of the first metal sheet and/or the second metal sheet and the second metal sheet being placed against the first metal sheet at the side, whereby adhesive which is arranged between the first metal sheet and the second metal sheet is urged into the reservoir. By means of the adhesive, the second metal sheet can be adhesively bonded to the first metal sheet. Furthermore, the adhesive allows the joint to be filled and consequently air to be urged out of the joint, whereby a risk of corrosion can be kept particularly low. The adhesive can flow into the joint via the reservoir or out of the reservoir. Corrosion of the component assembly as a result of moisture which precipitates or accumulates in the joint can thereby be prevented.

In this context, it has been found to be particularly advantageous for the reservoir to be in the form of an annular groove which delimits the opening at the circumference. The annular groove can be introduced into the first metal sheet and/or the weldable element in a particularly simple manner, whereby the reservoir can be provided in a particularly simple manner. For example, the annular groove can be milled in the first metal sheet and/or the weldable element.

Other features of the invention will be appreciated from the claims, the FIGURE and the description of the FIGURE. The features and feature combinations mentioned above in the description and the features and feature combinations mentioned below in the description of the FIGURE and/or only shown in the FIGURE can be used not only in the combination set out, but also in other combinations or alone.

The invention will now be explained in greater detail with reference to a preferred embodiment and the drawing.

BRIEF DESCRIPTION OF THE DRAWING

The single FIGURE shows a cross section of a component assembly for a motor vehicle, in which an aluminum sheet as a first metal sheet with a steel sheet as a second metal sheet are connected in the context of a resistance element welding operation using an auxiliary means, which is a weldable element, and the weldable element and the steel sheet are electrically insulated against the aluminum sheet by means of an adhesive.

DETAILED DESCRIPTION OF THE DRAWING

The single FIGURE shows a component assembly 1 for a motor vehicle. The component assembly 1 comprises an aluminum sheet 2 and a weldable element 4 which is inserted into an opening 3 of the aluminum sheet 2. The weldable element 4 is an auxiliary means, via which the aluminum sheet 2 can be secured to an additional component. In this instance, the component assembly 1 further comprises a steel sheet 5. The aluminum sheet 2 can be secured to the steel sheet 5 via the weldable element 4 as an auxiliary means. The steel sheet 5 can be retained via an adhesive layer on the aluminum sheet 2. Additionally, the steel sheet 5 can be resistance spot welded to the weldable element 4, whereby a materially engaging connection between the weldable element 4 and the steel sheet 5 is provided. In order to produce the component assembly 1, consequently, the weldable element 4 is introduced into the opening 3 of the aluminum sheet 2, wherein a joint 7 is delimited between the aluminum sheet 2 and the weldable element 4. Subsequently, the adhesive 6 is applied to a side 8 of the aluminum sheet 2 facing the steel sheet 5 and/or the steel sheet 5 and the steel sheet 5 is placed against the side 8 of the aluminum sheet 2 facing the steel sheet 5. By placing the steel sheet 5 against the side 8 of the aluminum sheet 2, the adhesive 6 is urged at least in regions, whereby the weldable element 4 is moved into abutment with the steel sheet 5. Subsequently, respective electrodes of a welding device are applied to the weldable element 4 and the steel sheet 5 and the weldable element 4 is welded to the steel sheet 5 by means of resistance spot welding using the welding device.

In order to keep corrosion particularly low between the aluminum sheet 2 and the weldable element 4 or the steel sheet 5, there is provision for the adhesive 6 to be introduced into the joint 7, whereby the joint 7 can be completely filled with the adhesive 6. Using the adhesive 6, consequently, air can be urged out of the joint 7. It is thereby possible to prevent air humidity from precipitating in the joint 7 or fluid from accumulating in the joint 7. As a result of the accumulation of fluid in the joint 7 being prevented, a current flow in the liquid can be prevented with the aluminum sheet 2 and/or the weldable element 4, whereby the risk of corrosion is kept particularly low.

In order to be able to ensure that the adhesive 6 flows into the joint 7, a reservoir 9 connected to the joint 7 is preserved at the side 8 of the aluminum sheet 2 facing the steel sheet 5. In this case, the reservoir 9 is in the form of an annular groove. In particular, the adhesive 6 which is located between the weldable element 4 and the steel sheet 5 can be urged into the reservoir 9. Subsequently, the adhesive 6 can flow out of the reservoir 9 into the joint 7 in order to completely fill the joint 7. The reservoir 9 is in this instance a recess of the aluminum sheet 2. The reservoir 9 is constructed to be open in the direction toward the steel sheet 5.

The weldable element 4 is in this case a press-in element. In this case, the weldable element 4 has a double cone form with tips directed counter to each other. The weldable element 4 can thereby be introduced in the aluminum sheet 2 in a positive-locking manner, whereby a particularly reliable connection is provided between the aluminum sheet 2 and the weldable element 4. The weldable element 4 can terminate flush with the aluminum sheet 2 at the side of the aluminum sheet 2 facing the steel sheet 5. Alternatively, the weldable element 4 can spring forward between the aluminum sheet 2 and the steel sheet 5 over the side 8 of the aluminum sheet 2 facing the steel sheet 5 at the height of an adhesive layer which is intended to be preserved. It is thereby possible to ensure that the adhesive layer between the steel sheet 5 and the aluminum sheet 2 is adjusted, wherein at the same time a direct planar abutment of the weldable element 4 against the steel sheet 5 is enabled.

In order to support an inflow of the adhesive 6 into the joint 7 and in this case to ensure a complete electrical insulation of the weldable element 4 with respect to the aluminum sheet 2, a vacuum suction device can be placed against an additional side 10 of the aluminum sheet 2 opposite the side 8 which faces the steel sheet 5. Using the vacuum suction device, the joint 7 can be acted on with a reduced pressure, whereby adhesive 6 stored in the reservoir 9 is drawn into the joint 7. Alternatively or additionally, by means of a temperature of the adhesive 6 being adjusted, the flow behavior thereof in the joint 7 can be influenced. One possibility is to heat the component assembly 1 in a heating apparatus, such as a heating apparatus of a cathode dip-coating apparatus. As a result of the heating of the component assembly 1, a viscosity of the adhesive 6 can be reduced, whereby the adhesive 6 flows particularly advantageously out of the reservoir 9 into the joint 7. Alternatively or additionally to heating the entire component assembly 1, at least adhesive 6 in the vicinity of the joint 7 can be heated by adjusting a temperature in the joint 7 during resistance welding, whereby the adhesive 6 flows into the joint 7 particularly advantageously. A temperature of an outer side, which delimits the joint 7, of the weldable element 4 can be adjusted via an adjustable current flow between the weldable element 4 and the steel sheet 5, whereby again the temperature of the joint 7 can be adjusted. In particular, a temperature which is intended to be adjusted in the joint 7 can be predetermined and the current flow can be selected in accordance with the predetermined temperature for the joint 7 during resistance welding, in which the predetermined temperature in the joint 7 results from thermal conduction in the weldable element 4. In order to be able to keep a welding temperature particularly low, the adhesive 6 may comprise adhesive substance proportions, the boiling temperature of which is below the temperature produced in the joint 7 during welding. During resistance welding, consequently, these adhesive substance proportions particularly evaporate out of the reservoir 9 into the joint 7 and can condense in the joint 7, whereby the joint is filled with the adhesive 6. Alternatively or additionally, a gelling agent and/or a propellant and/or magnetizable particles can further be added to the adhesive 6. The magnetizable particles bring about a flow of the adhesive 6 into the joint 7 in the event of a current flow between the steel sheet 5 and the weldable element 4 during the resistance welding. As a result of the current flow between the weldable element 4 and the steel sheet 5 during resistance welding, a magnetic field is produced at least in the joint 7. As a result of the magnetic field produced, the magnetizable particles of the adhesive 6 are orientated in the magnetic field, whereby the adhesive 6 is transported into the joint 7. The propellant may be, for example, a foam-forming agent which brings about a forward movement of the adhesive 6, particularly into the joint 7. Via the propellant, consequently, the adhesive 6 is urged out of the reservoir 9 into the joint 7. Using the gelling agent, the adhesive 6 can be gelled, whereby flow properties of the adhesive 6 can be adjusted. The adjusted flow properties by gelling the adhesive 6 can be selected in such a manner that the adhesive 6 flows into the joint 7 in a particularly simple and rapid manner. Using the adhesive 6, consequently, a contact zone, in this case the joint 7, between the aluminum sheet 2 and the weldable element 4 can be sealed.

The described component assembly 1 is based on recognition that in body construction there is the challenge of joining together aluminum sheets and steel sheets. In order to join the aluminum sheet 2 to the steel sheet 5, different joining methods can be used. In particular, the aluminum sheet 2 and the steel sheet 5 can be connected to each other via resistance element welding. If auxiliary means, in this instance the weldable element 4, are pressed in, a completely fluid-tight connection is scarcely possible without additional auxiliary agents between the weldable element 4 and the aluminum sheet 2. In order to secure the weldable element 4 to the aluminum sheet 2 so as to prevent corrosion, there is provision for the joint 7 to be completely filled with the adhesive 6. Using the adhesive 6, the aluminum sheet 2, the steel sheet 5 and the weldable element 4 can be protected from corrosion.

A problem which forms the basis of the corrosion is that, as a result of an electrochemical potential of aluminum and steel, a potential gradient is applied between the aluminum sheet 2 and steel sheet 5 which can result, with direct contact between the metal sheets and in the presence of an electrolyte, in corrosion effects. Similarly, air inclusions in cavities can result in corrosion effects if air humidity precipitates from included air. During the resistance element welding, in a first process step the weldable element 4 is pressed into the aluminum sheet 2, whereby a direct metal contact can occur between the weldable element 4 and the aluminum sheet 2 in the prior art. As a result of technical production inaccuracies, a contact zone of the weldable element 4 with the aluminum sheet 2 in the prior art cannot be formed to be completely smooth. In this case, air inclusions or capillaries may be anticipated.

In the component assembly 1 which is shown in the single FIGURE, initial effects of the adhesive 6 are selectively used in order to keep a risk of corrosion of the component assembly 1 particularly small. There is provision in the component assembly 1 for the opening 3 not to be completely filled with the weldable element 4, but instead for the reservoir 9 to be preserved, when the weldable element 4 is arranged in the opening 3 of the aluminum sheet 2. After application of the adhesive 6 between the steel sheet 5 and the aluminum sheet 2, the adhesive 6 is pressed, when the steel sheet 5 is pressed against the aluminum sheet 2, and flows into the preserved reservoir 9. Subsequently, the adhesive 6 is intended to be selectively brought into a contact zone between the weldable element 4 and the aluminum sheet 2. As a result of the vacuum suction device which is placed from an upper side, in this case the additional side 10, onto the aluminum sheet 2, can be combined with a set of welding tongs of a resistance welding device, can be placed flush around the weldable element 4 and can be acted on with suction, the adhesive 6 is drawn into the joint 7, which is a remaining air gap between the weldable element 4 and the aluminum sheet 2. In this manner, remaining cavities can be filled with the insulating adhesive 6 which further brings about a particularly high connection strength.

By selectively controlling the current load during the resistance spot welding, a temperature field in the joint 7 can be adjusted, which leads to the adhesive 6 in the reservoir 9 reaching a temperature, in particular a boiling temperature, which results in the adhesive 6 evaporating. This vapor with displaced adhesive particles can rise upward in the joint 7 in the manner of a chimney and close the joint 7 by means of the contained adhesive particles. By adding readily vaporizing, adhesive substance proportions in the adhesive 6, this selective vaporizing can be adjusted to temperature ranges which can be reached during resistance spot welding in the joint 7.

Alternatively or additionally, the magnetizable particles can be added to the adhesive 6. As a result of the alternating current field which is produced during resistance spot welding in the steel sheet 5 and the weldable element 4, an acting magnet is also produced in the joint 7. This magnetic field enables an adhesive proportion which is magnetized by means of the magnetizable particles to be pressed by means of an acting Lorentz force into the joint 7.

Alternatively or additionally, a temperature effect of a dryer oven acting as a heating apparatus of a cathode dip-coating device can be used in order to use the adhesive 6 for at least partially vaporizing and rising in the joint 7. Alternatively or additionally to adding magnetizable particles, it is possible to add propellant. This propellant leads to an increase in volume of the adhesive 6 when a predetermined temperature is adjusted and/or to the adhesive 6 flowing, whereby the adhesive 6 advances into the joint 7 by this propelling force and closes the joint in an insulating manner increasing the strength.

Effects of a diffusion can also be used, as a result of which the adhesive 6 diffuses in the joint 7 and closes it with increasing cooling. This diffusion effect can be supported by gelling the adhesive 6, whereby a capacity of the adhesive 6 for propulsion in comparison with the non-gelled adhesive is increased.

The aluminum sheet 2 may be at least a portion of an aluminum side frame of a motor vehicle. The connection of the aluminum sheet 2 to the steel sheet 5 can be reliably produced only via the resistance element welding, wherein an occurrence of a contact zone between the weldable element 4 and the aluminum sheet 2 can be sealed by the above-described effects. A particularly high connection strength can be achieved and a tendency toward corrosion can be kept particularly low, whereby a particularly advantageous failure behavior is achieved in a dynamic loading area.

Overall, the invention sets out a novel combination of at least one adhesive reservoir during resistance element welding for sealing and for increasing the strength.

LIST OF REFERENCE CHARACTERS

1 Component assembly
2 Aluminum sheet
3 Opening
4 Weldable element
5 Steel sheet
6 Adhesive
7 Joint
8 Side
9 Reservoir
10 Additional side

The invention claimed is:

1. A method for providing a component assembly for a motor vehicle, comprising the steps of:

inserting a weldable element into an opening of a first metal sheet such that a joint is defined between the weldable element and the first metal sheet and such that a reservoir connected to the joint is preserved at a first side of the first metal sheet that faces a second metal sheet, wherein the reservoir is open in a direction toward the second metal sheet;

applying an adhesive to the first side of the first metal sheet and/or to the second metal sheet;

placing the second metal sheet against the first side of the first metal sheet and the weldable element and, when the second metal sheet is placed against the first side of the first metal sheet that faces the second metal sheet, the adhesive flows into the reservoir and via the reservoir into the joint defined between the weldable element and the first metal sheet to completely fill the joint with the adhesive; and welding the second metal sheet to the weldable element.

2. The method according to claim 1, wherein the weldable element terminates flush with the first side of the first metal sheet that faces the second metal sheet and completely covers an opening cross section of the opening.

3. The method according to claim 1, further comprising the step of placing a vacuum suction device against a second side of the first metal sheet that faces away from the second metal sheet after the step of placing the second metal sheet against the first side of the first metal sheet, wherein the vacuum suction device covers the joint and wherein the adhesive in the reservoir is drawn from the reservoir into the joint by the vacuum suction device.

4. The method according to claim 1, wherein the second metal sheet is welded to the weldable element by resistance spot welding.

5. The method according to claim 4, further comprising the step of predetermining a temperature for the joint and adjusting a current flow of the resistance spot welding to result in the temperature.

6. The method according to claim 5, further comprising the step of selecting the adhesive based on the temperature, wherein a boiling point of adhesive substance proportions of the adhesive is below the temperature.

7. The method according to claim 1, wherein the adhesive contains magnetizable particles and/or a propellant and/or a gelling agent.

8. The method according to claim 1, further comprising the step of heating the component assembly in a heating apparatus after the step of applying the adhesive.

9. A component assembly for a motor vehicle, comprising:

a first metal sheet with an opening;

a weldable element disposed in the opening such that a joint is defined between the first metal sheet and the weldable element;

a second metal sheet; and an adhesive;

wherein a reservoir that is open in a direction toward a side of the first metal sheet that faces the second metal sheet is preserved at the side of the first metal sheet and is connected to the joint;

wherein the adhesive is disposed between the first metal sheet and the second metal sheet and in the reservoir and wherein the adhesive completely fills the joint defined between the weldable element and the first metal sheet.

10. The component assembly according to claim 9, wherein the reservoir is an annular groove.

* * * * *